(No Model.) 3 Sheets—Sheet 1.

H. SCHULZE-BERGE.
GLASS MELTING FURNACE.

No. 447,795. Patented Mar. 10, 1891.

WITNESSES:
W. B. Corwin
H. L. Gill

INVENTOR
Hermann Schulze-Berge
BY
W. Bakewell Sons
ATTORNEYS.

THE NORRIS PETERS CO., PHOTO-LITHO., WASHINGTON, D. C.

(No Model.) 3 Sheets—Sheet 2.

H. SCHULZE-BERGE.
GLASS MELTING FURNACE.

No. 447,795. Patented Mar. 10, 1891.

WITNESSES:
N. B. Corwin
H. L. Gill

INVENTOR
Hermann Schulze-Berge
BY
W. Bakewell & Sons
ATTORNEYS.

(No Model.) 3 Sheets—Sheet 3.

H. SCHULZE-BERGE.
GLASS MELTING FURNACE.

No. 447,795. Patented Mar. 10, 1891.

WITNESSES:

INVENTOR
Hermann Schulze-Berge
BY W. Bakewell & Sons
ATTORNEYS.

UNITED STATES PATENT OFFICE.

HERMANN SCHULZE-BERGE, OF ROCHESTER, PENNSYLVANIA.

GLASS-MELTING FURNACE.

SPECIFICATION forming part of Letters Patent No. 447,795, dated March 10, 1891.

Application filed July 14, 1890. Serial No. 358,714. (No model.)

*To all whom it may concern:*

Be it known that I, HERMANN SCHULZE-BERGE, of Rochester, in the county of Beaver and State of Pennsylvania, have invented a new and useful Improvement in Glass-Melting Furnaces, of which the following is a full, clear, and exact description.

My invention relates to an improvement in furnaces for melting glass; and it consists, chiefly, in a furnace having a main pot or vessel for melting the batch, a series of working pots or vessels, and means for transferring the molten glass from the pots by pneumatic pressure, substantially as herein described, reference being had to the accompanying drawings, forming part of this specification, in which—

Figure 1:
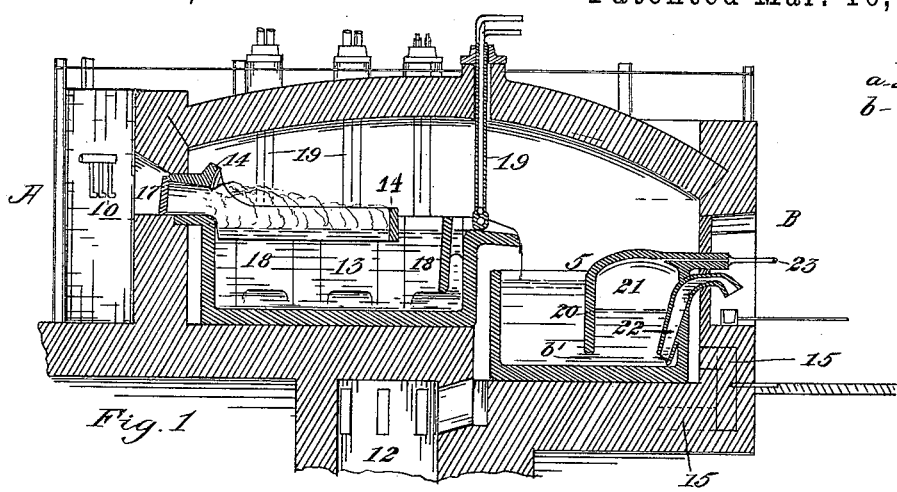
Figure 3:
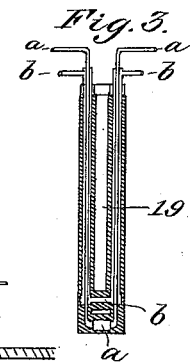
Figure 4:
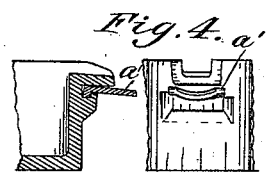
Figure 2:
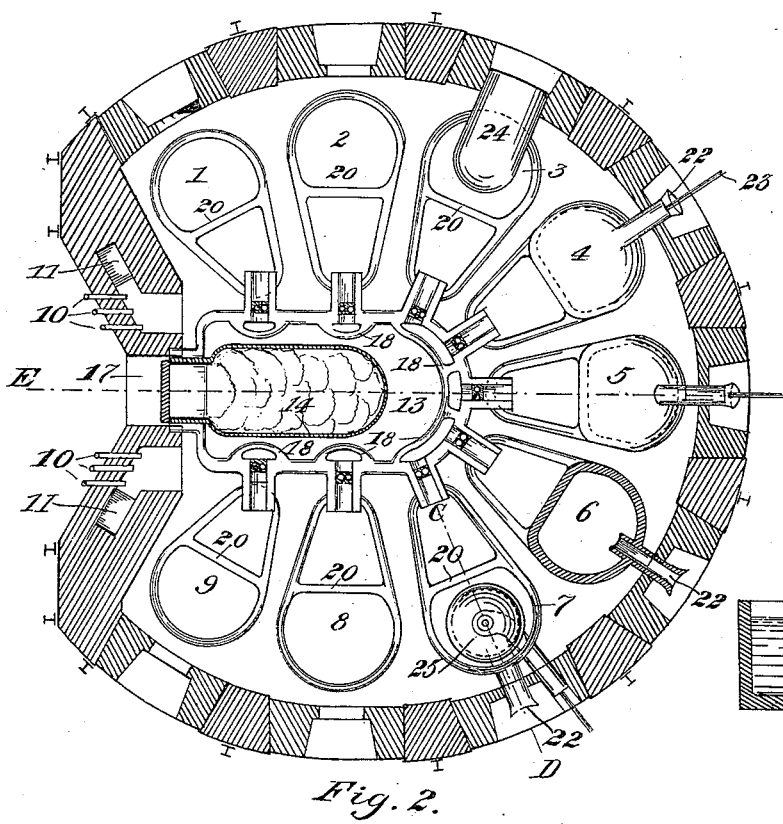
Figure 5:
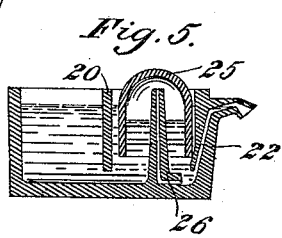
Figure 6:
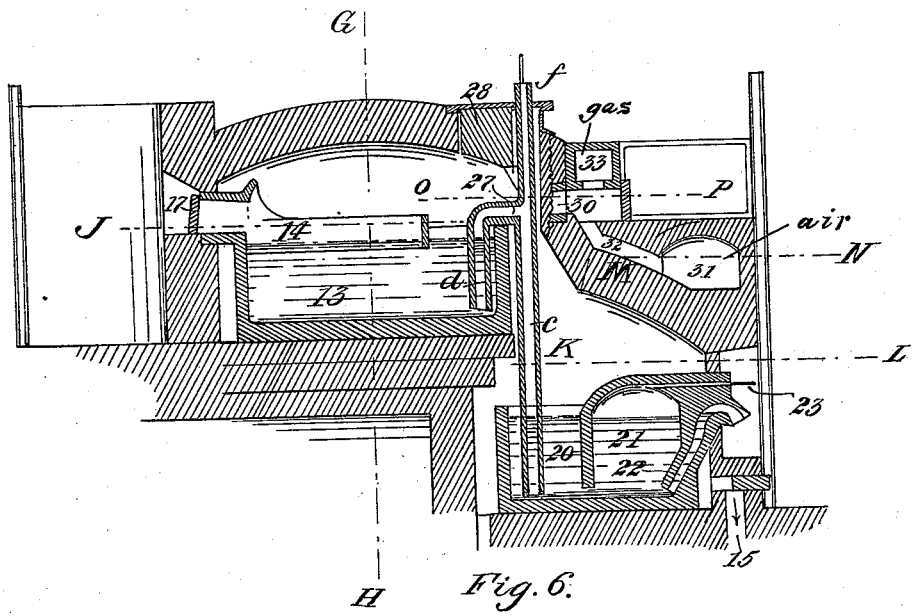
Figure 7:
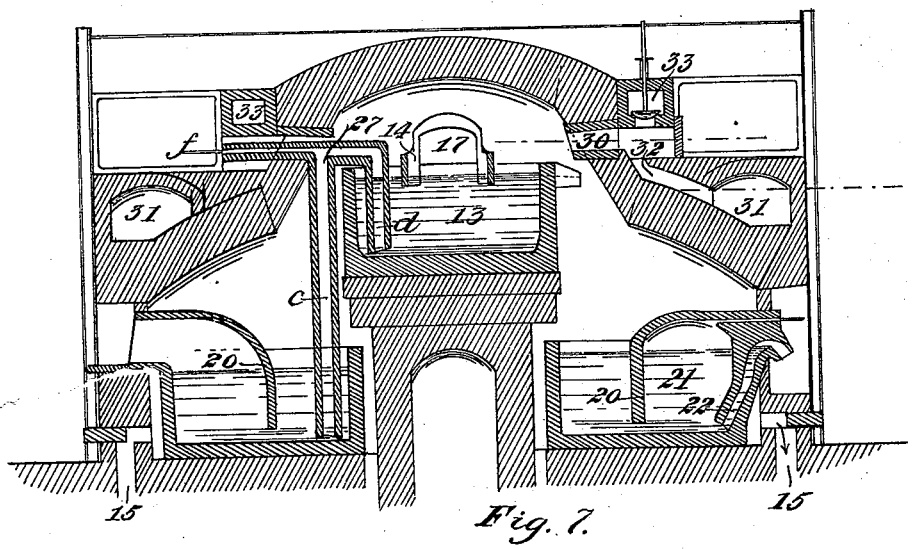
Figure 8:
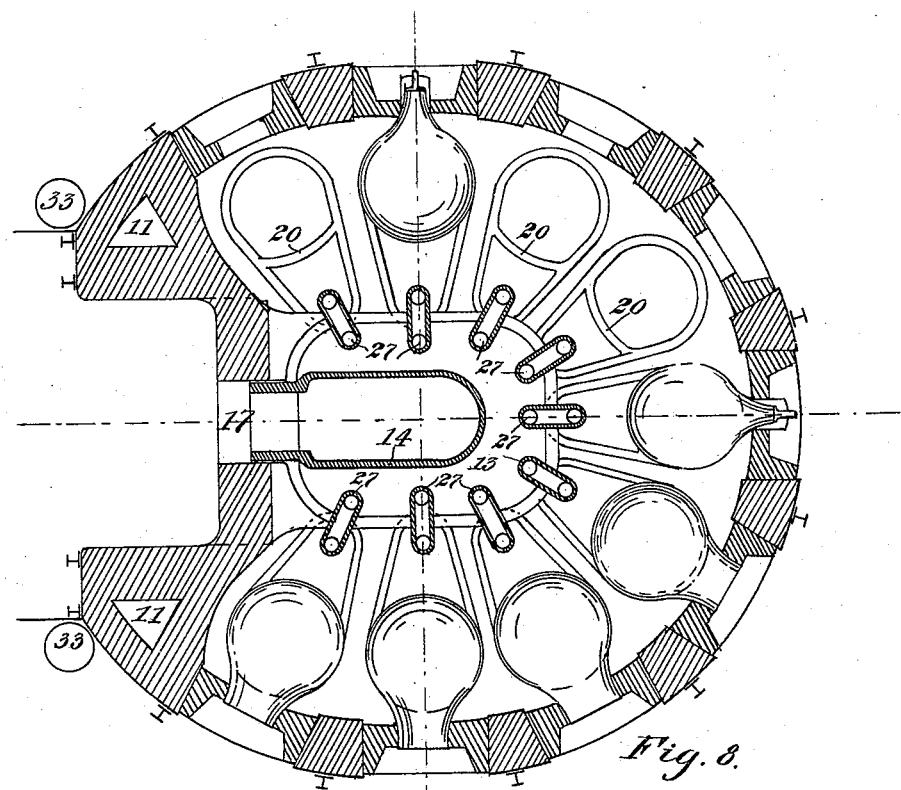
Figure 9:
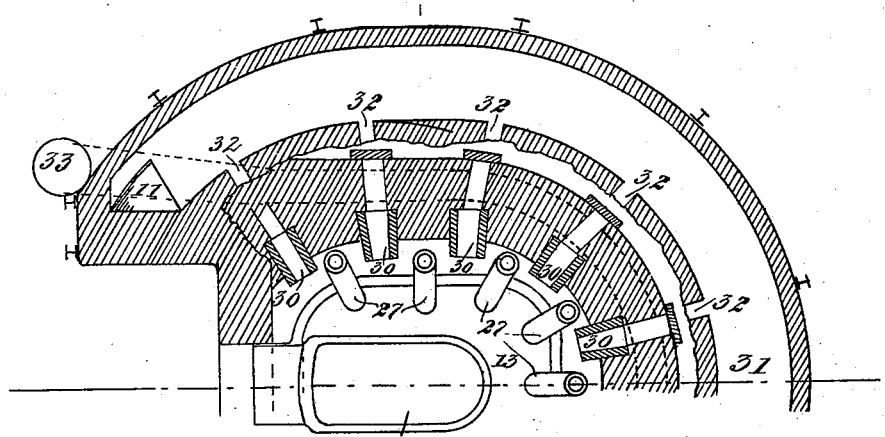

Figure 1 is a vertical sectional view of my improved furnace on the line E F of Fig. 2. Fig. 2 is a horizontal sectional view on the line A B of Fig. 1. Figs. 3, 4, and 5 are detail views of parts of the furnace. Fig. 6 is a longitudinal vertical sectional view showing a modification. Fig. 7 is a cross-vertical sectional view on the line G H of Fig. 6. Fig. 8 is a horizontal sectional view on the line J K and K L of Fig. 6. Fig. 9 is a horizontal sectional view on the lines O P and M N of Fig. 6.

Like symbols of reference indicate like parts in each.

The furnace may be heated by the use of natural gas, as is shown in Figs. 1 and 2, in which gas-inlet pipes 10 and air-flues 11, for introducing a blast of heated air, are shown, or where manufactured gas is to be employed a suitable system of flues (shown in Figs. 6, 7, 8, and 9 and hereinafter described) may be substituted, or solid fuel may be used in the customary manner in a grate situate in the eye or well 12 of the furnace. The heat, by whatever means it may be generated, strikes the main melting pot or vessel 13, in which pot or vessel the batch is fused, and after encircling the glass-working pots (numbered in the drawings from 1 to 9) the gases of combustion pass out of the furnace through the flues 15 in front of the working-pots, and thence may be conducted into an air-heating apparatus or regenerator, or they may be utilized in any other way desired before passing to the chimney.

As shown in the drawings, the main or melting pot or vessel 13, in which the batch is fused, is centrally located in the furnace and is provided with a swimming-frame 14, into which the batch is fed, and which prevents the unfused portion of the batch from spreading on the surface of the molten glass. This swimming-frame is anchored in the feeding-opening 17 in such a manner that while it can follow a rise or fall in the level of the molten-glass batch, yet it remains in place with reference to the charging-opening. The batch may be fed by any of the usual ways, either continuously or intermittently, and the melting-vessel may be made removable and arranged to be heated at its sides as well as from above. This melting-vessel 13 is provided with a plurality of overflow-outlets, which discharge the molten batch into a corresponding number of working pots or receptacles. These various overflows may be provided with intercepting-skimmers 18, by means of which any unfused portion of the batch which may have passed over the frame 14 is intercepted and prevented from passing the overflows, which overflows may all be situate at the same level, and each of them is provided with a stopper 19, by means of which any one or more of the overflows may be banked up sufficiently to prevent the discharge therefrom. When the batch is introduced into the melting-pot and while the batch is melting, there is generally but one overflow open, and when the working-pot to which it leads is sufficiently charged it may be banked by its stopper 19, and the stopper at the overflow to a second, third, or more working-pots is removed. This stopper 19 is shown on a larger scale in Fig. 3; and it consists of two concentric U-shaped pipes *a a* and *b b*, in both of which a cooling medium—such as water, steam, or the like—circulates, and they are covered with refractory tubes or a clay lining and are capable of being raised from or lowered on the overflow. When it is desired to close or bank up the overflow, the stopper is lowered until it comes in contact with the molten glass in the overflow and chills the same. When it is desired to again open the overflow, the flow of the cooling medium through the pipes *a a* and *b b* is cut off until the chill is taken from that portion of the stopper in contact with the glass and the stopper may be removed. As the overflow-lips are liable to be worn off by the flow of the molten glass, interchangeable and removable lips $a'$ are fitted in slideways beneath the main and original lip, so as to prolong the life of the melting-vessel after the original lip has worn away.

In the drawings I have shown various forms of working-pots or secondary receptacles, as indicated by the numbers 1 to 5 in Fig. 2. The pot marked 5 (see Fig. 1) consists of a vessel uncovered on the side toward the melting-vessel, so as to be capable of receiving molten glass from the same, while the front part, toward the outside of the furnace, is separated from the receiving part by a partition or wall 20, which partition is provided near the bottom of the pot with a hole or slot $b'$, through which the glass enters the front part of the working-pot, and the top part of the partition is prolonged into a hood or cover connecting with the side walls of the pot, forming a closed chamber. From near the bottom of this chamber a tube 22 leads through the wall of the working-pot and terminates at the outside of the furnace at a height a little below the top or rim of the open sides of the working-pot. Another tube 23 connects by a close joint with the closed chamber 21 of the working-pot. Owing to this construction if the tube 23 be open to the atmosphere the glass received by or contained in the working-pot will rise to the same level inside of the closed chamber 21 as in the uncovered or receiving part of the pot, and also in the tube 22. When it is desired to remove the glass from the working-pot, the tube 23 is connected with a reservoir containing compressed gas or air, and owing to the pressure of the air (or gas) the glass in the covered chamber 21 will be depressed and will be forced out of the tube 22 in proportion as the compressed air is allowed to enter. Care should be taken to not admit too much air suddenly, as in such case part of the glass might rise over the open sides of the working-pot and be discharged into the furnace. Only so much of the glass can be discharged out of the working-pot as is contained in the closed chamber 21 above the slot $b'$, while the rest contained in the bottom of the working-pot remains, forming a constant stock of fluid glass in the working-pot. In place of this form of working-pot a variety of differently-constructed working-pots may be used, either with or without means for pneumatically discharging the fluid glass therefrom.

The working-pots may be removable and may be constructed so that the heat can act upon the contents of the pot as well from above as from the sides. Some of such constructions are indicated by the various working-pots shown in Fig. 2, in which, for instance, pots 1, 2, 8, and 9 are common open pots provided with only the vertical partition 20. Pot 3 is the same, but provided, furthermore, with a dip-bonnet 24. Pots 4, 5, and 6 are similar to the pot shown in Fig. 1. Pot 7 is shown in cross-section in Fig. 5, and is adapted to discharge part of the glass contained therein pneumatically. It is provided with a swimming dome-shaped bell, replacing the chamber 21 of the working-pot of Fig. 1. The air to displace the glass is introduced from below by the upright tube 26, which may be connected with a reservoir containing compressed air or gas.

While the constructions described with reference to Figs. 1 and 2 are applicable for the desired purpose, yet the modification which I prefer is represented by Figs. 6 to 9 upon Sheets 2 and 3, as it is more suitable for the same purpose. In general principle this modification is the same as that already described. It consists of a central melting-vessel, which may be oblong or square, or, if desired, there may be more than one melting-vessel, which may be removable or built up within the furnace, and a series of wide pendent receiving or working pots of the same kind as those explained before, either with or without means for pneumatic discharge of the fluid glass therefrom.

The construction of the air and gas flues and the means for applying the heat more effectually for the purpose of melting the batch are somewhat different, and also the means for transferring the molten glass from the melting-vessel into the various working-pots. With reference to the latter a siphon 27 is used, consisting of three shanks or ways $c\ d\ f$, two of which $c$ and $d$ are placed with their ends terminating in the melting-vessel 13 and one of the working-vessels, respectively, while the third shank or tube leads to the outside of the furnace and is placed so that it may be in connection with a vacuum-pump. These devices, forming the siphon 27, may be made removable or interchangeable, as is shown in Fig. 6, in which case after removing the lid 28 the siphon 27 can be withdrawn from the furnace and be replaced by a new one. Whenever the glass is worked out of the working-pot, the siphon may be started by partly evacuating the air from it by way of the tube, and when sufficient glass has run over the flow is stopped by allowing the air to re-enter the siphon through the tube $f$. By this arrangement the glass can be transferred from the melting-vessel 13 into the working-pots without causing the melting-pot to wear out, since there is no overflow, and the wear and tear act only on the siphon, which after being worn out can easily be replaced.

To cause the flame generated from gaseous fuel to act more energetically upon the batch, a number of entrances or tuyeres 30 for the fuel and air are located in a ledge or a recess of the crown of the furnace, by which arrangement I am enabled to bring the flame to bear upon the batch in a more efficient way. A canal 31, conducting heated air or a blast of the same, encircles the furnace and delivers the blast through the flues 32 into the tuyeres, while the flue or canal 33, likewise encircling the furnace, conducts the generated gas or fuel gas to the tuyeres and distributes it all around the sides of the melting-vessel, which are available for this purpose. By this construction the strongest heat is caused to impinge and act upon the batch from the various tuyeres located close to the surface of the melting-vessel.

What I claim, and desire to secure by Letters Patent, is—

1. In a glass-melting furnace, a melting-vessel for melting the glass batch, a separate working-vessel constructed and arranged to receive the molten glass from the melting-vessel, and a removable and exchangeable siphon adapted to transfer the fluid glass from the melting-vessel into the working-vessel, substantially as and for the purposes described.

2. In a glass-melting furnace, a melting-vessel for melting the glass batch, a series of separate glass-working pots, each one directly and independently of the others capable of receiving the molten glass from the melting-pot, and means, substantially as described, for transferring the glass from the melting-vessel to the working vessels or pots, substantially as and for the purposes described.

3. In a glass-melting furnace, the combination of a melting-vessel, a separate working-vessel situate in the path of the waste heat from the melting-vessel, and a siphon for transferring the molten glass from the melting-vessel to the working-pot, substantially as and for the purposes described.

4. In a glass-melting furnace, the combination of a melting-vessel and a siphon for transferring the molten glass from the melting-vessel into a working-vessel, which siphon is provided with an exhaust-tube leading therefrom to the outside of the furnace, substantially as and for the purposes described.

5. In a glass-melting furnace, the combination of a glass-working pot adapted to receive the glass from a glass-melting vessel, provided with a covered front chamber, an adit-pipe for introducing compressed air into the front chamber, and an outlet-pipe leading into the front chamber for the discharge of the glass, substantially as and for the purposes described.

6. In a glass-melting furnace, the combination of a glass-melting vessel for melting the batch, a series of glass-working pots or vessels, each one constructed to receive separately and independently of the other working-pots the glass from the melting-vessel and constructed to be heated from the sides and from above, and a siphon, substantially as described, constructed to transmit the fluid glass from the melting-vessel into the glass-working pot, substantially as and for the purposes described.

7. In a glass-melting furnace, the combination of a melting-vessel, a separate working-vessel, and a siphon connecting said vessels, which, with the siphon, are contained within the furnace, substantially as and for the purposes described.

In testimony whereof I have hereunto set my hand this 2d day of July, A. D. 1890.

HERMANN SCHULZE-BERGE.

Witnesses:
CHAS. W. HURST,
FRED TORRENCE.